(12) United States Patent
Kato et al.

(10) Patent No.: US 6,455,944 B1
(45) Date of Patent: Sep. 24, 2002

(54) ALIGNMENT OF AN OPTICAL ASSEMBLY (75) Inventors: Takeshi Kato, Akishima (JP); Tatsuo Teraoka, Hitachi (JP); Satoru Kikuchi, Kokubunji (JP); Masahiro Aoki, Kokubunji (JP); Yoshitada Oshida, Fujisawa (JP)

(73) Assignees: Hitachi, Ltd., Tokyo (JP); Hitachi Cable Ltd., Tokyo (JP)

( * ) Notice: Subject to any disclaimer, the term of this patent is extended or adjusted under 35 U.S.C. 154(b) by 0 days.

(21) Appl. No.: 08/523,994

(22) Filed: Sep. 5, 1995

(30) Foreign Application Priority Data

Sep. 12, 1994 (JP) ............................... 6-216939

(51) Int. Cl.⁷ .......................... H01L 23/544; G02B 6/42
(52) U.S. Cl. .......................... 257/797; 257/466; 385/88
(58) Field of Search .................... 257/98, 466, 620, 257/622, 797; 385/89, 90, 88

(56) References Cited

U.S. PATENT DOCUMENTS

| 5,042,709 A | 8/1991 | Cina et al. ................... 228/105 |
| 5,179,609 A | 1/1993 | Blonder et al. ............... 385/89 |
| 5,454,055 A | * 9/1995 | Kragl et al. .................. 385/14 |
| 5,555,333 A | * 9/1996 | Kato ........................... 385/89 |

FOREIGN PATENT DOCUMENTS

| EP | 0 217 063 | 4/1987 | |
| EP | 0 532 470 | 3/1993 | |
| WO | 93/11453 | 6/1993 | ............ G02B/6/45 |

OTHER PUBLICATIONS

K. Kurata, K, Yamauchi, A. Kawatani, H, Tanaka, H. Honmou and S. Ishikawa, *A Surface Mount Single–Mode Laser Module Using Passive Alignment,* IEEE Transitions on Components, Packaging, and Manufacturing Technology—Part B, vol. 19, No. 3 Aug., 1996.
Cohen et al., Proceedings of 43rd Electronic Components and Technology Conference, pp. 808–817, 1993.

* cited by examiner

Primary Examiner—Allan R. Wilson
(74) Attorney, Agent, or Firm—Kenyon & Kenyon (57) ABSTRACT

An optical assembly has a substrate and an optical device chip. On mutually opposed surfaces of the optical device chip and the substrate, indexes having slope faces are formed. Index passage alignment is performed by using the indexes as positioning reference and by using image measurement.

13 Claims, 7 Drawing Sheets

ALIGNMENT OF AN OPTICAL ASSEMBLY

BACKGROUND OF THE INVENTION

The present invention relates to an optical assembly fabricated by mounting an optical device chip on a substrate, and in particular to an optical assembly of a passive alignment scheme suitable for reduction of the fabrication cost and a method for fabricating the same.

Reduction of fabrication cost of the optical device chip and the substrate is required of optical assemblies. In recent years, a passive alignment scheme (in which the optical device chip is not activated) is being studied vigorously instead of the conventional active alignment scheme (in which alignment is performed while the optical device chip is being activated).

Passive alignment schemes are divided broadly into two categories: index alignment scheme and self alignment scheme. In the index alignment scheme, alignment is performed by conducting image recognition on marks provided on the optical device chip and the substrate. In the self alignment scheme, alignment in the horizontal direction of the substrate is automatically performed by the surface tension of a solder bump which connects the optical device chip to the substrate. In order to reduce the dispersion of height in a direction perpendicular to the substrate, however, a measure such as control of the bump volume with high accuracy or formation of a standoff for positioning on the substrate is needed. In the existing circumstances, therefore, the index alignment scheme is considered to be more advantageous than the self alignment scheme.

As for the index alignment scheme, one described in Proceedings of 43rd Electronic Components and Technology Conference, pp. 808–817, 1993 and one described in 1994 Spring National Convention Record of the Institute of Electronics, Information, and Communication Engineers (IEICE), presentation No. C-291, for example, are known.

The optical assembly of the former-cited paper includes a laser chip of ridge waveguide type, a fiber carrier substrate, and an alumina substrate. Separately from them, an alignment plate is used. The chip, carrier substrate, and plate have an index having a cross-shaped ridge, an index having a cross-shaped hollow on a silicon nitride film, and an index having a cross-shaped opening in a chromic film, respectively. The chip and the carrier substrate are aligned by effecting image recognition on cross-shaped patterns while applying illumination transmitted through the plate. Thereafter, the chip and the carrier substrate are subjected to vacuum adsorption and soldered to the alumina substrate.

The optical assembly described in the latter-cited paper includes a laser chip and a silicon substrate. The substrate has a V-shaped groove for placing a fiber thereon. The chip and the substrate have an index formed by patterning an electrode circularly and an index formed by removing the electrode circularly, respectively. The chip is aligned by performing image recognition on the circular pattern while applying illumination transmitted through the substrate and the chip. The chip is soldered onto the substrate.

SUMMARY OF THE INVENTION

An object of the present invention is to provide an optical assembly including an optical device chip and a substrate each provided with indexes so as to allow image detection with high accuracy and formation with high accuracy.

Another object of the present invention is to provide a method for fabricating an optical assembly including an optical device chip and a substrate each provided with indexes so as to allow image detection with high accuracy and formation with high accuracy.

As a matter of course, improvement of alignment accuracy of the optical device chip and the substrate is important for optical assemblies. Typically the alignment accuracy is required to be equal to or less than the spot size of a light emission portion or a light receiving portion of the optical device chip or equal to or less than the spot size of an optical waveguide formed or mounted on the substrate. To be concrete, accuracy equal to or less than 1 µm, for example, is needed. In the index alignment scheme, high accuracy formation of indexes with respect to the optical axis of the chip or the substrate and high-accuracy image recognition of these indexes are especially primary subjects. For performing high-accuracy image recognition, it is necessary to form, on the chip or the substrate, indexes for providing high-contrast images.

In the index of the laser chip described in the aforementioned paper, a silicon nitride film and a gold reflecting film are deposited on the top of the cross-shaped ridge surface and the peripheral around the ridge surface in order to improve the contrast between the top surface and the peripheral surface. An optical interference effect is used by controlling the thickness of the silicon nitride film so as to attain a thickness of 110 nm and by illuminating with monochromatic light. In the index of a fiber carrier substrate, the silicon nitride film is controlled to have a thickness of 120 nm in order to obtain the contrast between the bottom face of a cross-shaped hollow on the silicon nitride film and the top face.

Thus in the case where the top face of the ridge and the bottom face of the hollow which are parallel to the surface of the chip and the substrate are used, it is not easy to obtain high contrast images because they are parallel to each other. Considering dispersion in film thickness and dispersion in illumination of microscope optical system at the time of mass production, it is conjectured that variation in contrast, i.e., variation in alignment accuracy is caused. In the technique of the former-cited paper, therefore, the consideration given to the fabrication yield of optical assemblies is not sufficient.

In the latter-cited paper, metal electrodes of the laser chip and the silicon substrate are used as indexes. Patterning of the index of the chip is performed separately from the photolithography process for forming a laser active layer. Patterning of the index of the substrate is performed separately from the photolithography process for forming a V-shaped fiber groove.

In the case where a metal pattern is used as the index, there is a great difference in transmissivity or reflectivity between the material forming the chip or the substrate and the metal and hence a high-contrast image is obtained easily. However, patterning of the active layer or the V-shaped groove and patterning of metal are conducted separately. Because of the alignment error of the photomask, therefore, misalignment of the index of the active layer or the V-shaped groove is caused. In the technique of the latter-cited paper, the consideration given to the alignment accuracy of optical assemblies is insufficient.

As heretofore described, any optical assembly using conventional techniques cannot satisfy requirements of both high accuracy and simplicity for index alignment. Thus the present invention aims at realizing indexes which can be formed with high accuracy in an optical assembly and allows easy detection of a high-contrast image.

First, the present invention provides an optical assembly including an optical device chip and a substrate and having index alignment means which makes possible a reconciliation of high-accuracy formation and high-accuracy image detection;

Secondly, the present invention provides more concretely an index shape associated with the alignment means and suited for high-accuracy formation;

Thirdly, the present invention provides a basic index shape suited for formation and image measurement;

Fourthly, the present invention provides an index shape captured as an image;

Fifthly, the present invention provides index forming means suited for the case where the chip or the substrate includes a crystal;

Sixthly, the present invention provides index forming means more suited for the chip or the substrate;

Seventhly, the present invention provides means for configuring indexes suited for high-accuracy image detection;

Eighthly, the present invention provides means for forming indexes with high accuracy;

Ninthly, the present invention provides index forming means suited for the case where the chip or the substrate has an optical waveguide device;

Tenthly, the present invention provides index forming means suited for the case where the chip or the substrate includes a semiconductor optical device;

Eleventhly, the present invention provides chip placement means contributing to improvement of alignment accuracy in a vertical direction to the chip or the substrate;

Twelfthly, the present invention provides optical fiber placing means suited for the case where the chip or the substrate includes a silicon crystal having plane orientation (100);

Thirteenthly, the present invention provides configuration means for fixing a light emission/light receiving device and an optical waveguide substrate with high accuracy by means of index alignment; and Fourteenthly, the present invention provides an assembly process for fixing the light emission/light receiving device and the optical waveguide substrate with high accuracy by means of index alignment.

First, an optical assembly according to the present invention includes an alignment index having, on at least one of the surface of an optical device chip and on the surface of a substrate for mounting the chip thereon which is opposed to the surface of the optical device chip, a face sloped with respect to the surface;

Secondly, an optical assembly according to the present invention includes an index having a hole or a moat;

Thirdly, an optical assembly according to the present invention includes an index having a quadrangular pyramid as a basic shape;

Fourthly, an optical assembly according to the present invention has such an image of the slope face of the index projected onto, for example, the surface of the chip or the substrate as to take the shape of a picture frame;

Fifthly, an optical assembly according to the present invention includes, in the chip or the substrate including a crystal, an index having a crystal plane as the slope face;

Sixthly, an optical assembly according to the present invention includes, in the chip or the substrate including a crystal, an index having the (111) crystal plane as the slope face;

Seventhly, an optical assembly according to the present invention includes an index sloped with respect to the surface of the chip or the substrate with a slope value equal to or larger than a value represented by $\sin^{-1}(n_2/n_1)$ where $n_1$ and $n_2$ are refractive index values of materials forming the slope face and $n_1 > n_2$;

Eighthly, an optical assembly according to the present invention includes an index etched simultaneously with etching of the device portion formed on the chip or the substrate, or an index etched by using, as an etching mask, the same material as at least a part of the device portion;

Ninthly, an optical assembly according to the present invention includes, in the chip or the substrate having an optical waveguide device, an index etched simultaneously with etching for defining the core of the optical waveguide device or etched by using the core material as the mask;

Tenthly, an optical assembly according to the present invention includes, in the chip or the substrate having an optical waveguide device, an index etched simultaneously with etching for defining an active area or a waveguide area of the semiconductor optical device; Eleventhly, an optical assembly according to the present invention includes the chip placed on the substrate in a flip chip manner;

Twelfthly, an optical assembly according to the present invention includes, in the chip or the substrate including a crystal, an index having a (111) plane and a V-shaped groove for disposing and optical fiber;

Thirteenthly, an optical assembly according to the present invention is obtained by mutually positioning and fixing, by means of image measurement, a slope face index formed simultaneously with the light emission/light receiving portion of the optical device and a slope face index formed simultaneously with the optical waveguide portion or the optical waveguide device mounting portion of the substrate; and Fourteenthly, an optical assembly fabrication method according to the present invention includes the steps of superposing the optical device having a slope face index on a substrate having a slope face index, observing the indexes on images by using transmission illumination or vertical illumination of a microscope to detect positions of the optical device and the substrate, correcting the position deviation by using a fine movement stage, for example, and fixing the optical device to the substrate.

In accordance with a first aspect of the present invention, an alignment index having a slope face is illuminated from a direction perpendicular to the surface of the optical device chip or the substrate and is subjected to image recognition. The transmissivity/reflectivity of the index depends upon the slope angle. Since an evident brightness difference is caused between the index and the surface of the chip or the substrate, an image having a favorable contrast is obtained. The slope face of the index can be formed with high accuracy in the same way as the device portions of the chip and substrate. The slope angle is determined to be a constant value depending upon the material characteristics of the chip and substrate and the method of etching or the like. As a result, dispersion of contrast and alignment accuracy is small. Unlike the conventional technique of performing image recognition on planes which are parallel to each other, therefore, it is not necessary to control the minute film thickness of the index or intentionally use the optical interference effect. Furthermore, unlike the conventional technique of using the metal pattern as the index, misalignment of photolithography with respect to the device portion of the chip and substrate is not caused.

In accordance with a second aspect of the present invention, the slope face of the index is formed as the side face of a hole or the side face of a moat of a V-shaped groove or a U-shaped groove by the etching process in the same way as the device portion of the chip or the substrate. As compared with the case where the slope face is formed as the side face of a projection by the deposition process, the slope face can be easily formed with high accuracy.

In accordance with a third aspect of the present invention, the slope face of the index is formed basically as a side face of a quadrangular pyramid. As for the photomask pattern used for photolithography, a quadrilateral made up of straight lines is easier to make than a circle made up of curved lines as in the conventional technique. Since the slope face of the quadrangular pyramid is detected as a quadrilateral image, image processing such as centroid coordinate measurement can be conducted more easily than the cross image of the conventional technique. In the case where the chip or the substrate includes a crystal, the slope face can be formed with high accuracy and stably when a quadrangular pyramid is formed by anisotropic etching as compared to when a cone or the like is formed by isotropic etching.

In accordance with a fourth aspect of the present invention, a hollow frame pattern is detected as an index image and image processing is conducted. As compared with the case where all pixels of circular or cross-shaped smear-out pattern are calculated as in the conventional technique, the number of pixels to be calculated is reduced and processing time is shortened in the case of the frame pattern.

In accordance with a fifth aspect of the present invention, the slope face of the index is formed by using dependence of the etching speed upon the crystal orientation, i.e., by using anisotropy. Since a crystal plane of a slow etching speed is left as a slope face, dependence upon the process condition is not significant and the control performance is good.

In accordance with a sixth aspect of the present invention, a crystal plane having plane orientation (111) is formed as the slope face of the index. In crystals frequently used in the chip or the substrate, the etching speed of the (111) plane is typically the slowest as compared with other crystal planes. Therefore, the index is formed with higher accuracy.

In accordance with a seventh aspect of the present invention, light illuminated from a direction nearly perpendicular to the surface of the chip or the substrate is totally reflected by the slope face of the index. Therefore, the index looks black as an image, resulting in a very high contrast value.

In accordance with an eighth aspect of the present invention, the index is etched by using the same photomask as the device portion located on the chip or the substrate uses or by using, as the etching mask, the same material as used for the device portion. Accordingly, the index is formed in self alignment with the device portion. Unlike the conventional technique, therefore, misalignment of the photomask does not occur.

In accordance with a ninth aspect of the present invention, the index is formed in self alignment with the core of an optical waveguide device such as a waveguide type semiconductor laser, a waveguide type photodector, or a dielectric waveguide.

In accordance with a tenth aspect of the present invention, the index is formed in self alignment with the active area or the waveguide area of a semiconductor optical device such as a laser diode, a photodiode, or an optical switch.

In accordance with an eleventh aspect of the present invention, the chip is subjected to flip chip bonding, with a function layer being oriented to the substrate side. In the case where the chip is an active device, it means the junction down state. Therefore, accuracy of height from the substrate surface to the function layer is improved. Because in the chip fabrication process the height from the chip surface of the function layer side to the function layer is controlled with higher accuracy than the height from the chip surface of the opposite side to the function layer. Unlike the conventional technique in which flip chip bonding is not performed, the present invention technique does not need two process steps, i.e., the step of temporarily adsorbing the function layer side of the chip, and the step of thereafter fixing the opposite side to the substrate.

In accordance with a twelfth aspect of the present invention, a V-shaped groove having a (111) plane for mounting an optical fiber thereon is formed together with the indexes, on the chip including a silicon crystal of plane orientation (100) or on the substrate. The silicon crystal is widely used as the base material of photodetectors and dielectric optical waveguides. In addition, the silicon crystal allows etching with a very large anisotropy value and has mechanical strength comparing favorably with steel. Therefore, the silicon crystal is suitable for V-shaped grooves for fiber. Furthermore, the V-shaped groove is etched by using the same mask as the indexes use. Therefore, misalignment does not result.

In accordance with a thirteenth aspect of the present invention, indexes of the optical device and the substrate are formed in self alignment with their respective optical axes, position detection is performed on the basis of these indexes, and the optical device is mounted on the substrate.

In accordance with a fourteenth aspect of the present invention, indexes of both the optical device and the substrate are observed as clear images in the same field of view. Therefore, relative position deviation is detected with high accuracy. After this position deviation has been corrected, the optical device is fixed to the substrate.

First, according to the present invention, indexes can be formed with high accuracy and simply and high-contrast images can be subjected to measurement processing by forming indexes each having a slope face on surfaces of the optical device chip and the substrate. Therefore, alignment accuracy of the optical assembly can be improved simply. In turn, the fabrication cost can be reduced.

Secondly, a hole or a moat is formed on the surface of each of the chip and the substrate. Thereby, the present invention brings about an effect that the slope face of each index can be formed easily as the side face of the hole or the moat.

Thirdly, each index has a quadrangular pyramid as the basic shape. Thereby, the present invention brings about an effect that the slope face of the index can be formed with high accuracy and stably as the side face of the quadrangular pyramid. In addition, the present invention brings about an effect of facilitating image measurement processing because the image of the index is quadrilateral.

Fourthly, the slope face of the index takes the shape of a picture frame. Hence the image of the index becomes hollow. Therefore, the present invention brings about an effect of shortening the image processing time and reducing the cost.

Fifthly, anisotropy of the crystal forming the chip or the substrate is used. Thereby, the present invention brings about an effect that the index including a sloped crystal plane can be worked with high controllability.

Sixthly, the (111) crystal plane is used as the slope face of the index. Thereby, the present invention brings about an effect that the index can be worked with higher controllability.

Seventhly, illumination light is totally reflected at the slope face of the index. Thereby, an image with a high contrast value and a very large signal-to-noise ratio is obtained. Thus the present invention brings about an effect that position detection can be conducted with high accuracy.

Eighthly, the indexes are formed in self alignment with device portions of the chip and the substrate. Thereby, the present invention brings about an effect of higher accuracy of the indexes.

Ninthly, the present invention brings about an effect that the indexes can be formed with high accuracy with respect to the core of the optical waveguide device formed in each of the chip and the substrate, by using a self-alignment technique.

Tenthly, the present invention brings about an effect that the index can be formed with high accuracy with respect to the active area and the waveguide area of the semiconductor optical device of each of the chip and the substrate by using a self-alignment technique.

Eleventhly, the chip is flip-chip bonded to the substrate. Thereby, the present invention brings about an effect of improving the alignment accuracy of height from the surface of the substrate to the function layer.

Twelfthly, indexes each having the (111) plane and the V-shaped groove for optical fiber are simultaneously formed on the chip and the substrate each including a silicon crystal. Thereby, the present invention brings about an effect that misalignment between the indexes and the V-shaped groove can be prevented.

Thirteenthly, the optical axis of the light emission/light receiving portion of the optical device coincides with high accuracy with the optical axis of the optical waveguide portion of the substrate or the optical waveguide device mounting portion. Thereby, the present invention brings about an effect that an optical assembly having an optical coupling loss reduced to the minimum can be realized.

Fourteenthly, the present invention brings about an effect that a process for positioning and fixing the optical device and the optical substrate with high accuracy can be implemented by a simple system using a microscope, an image processing device, and,a fine movement stage.

DETAILED DESCRIPTION

Figure 1A:
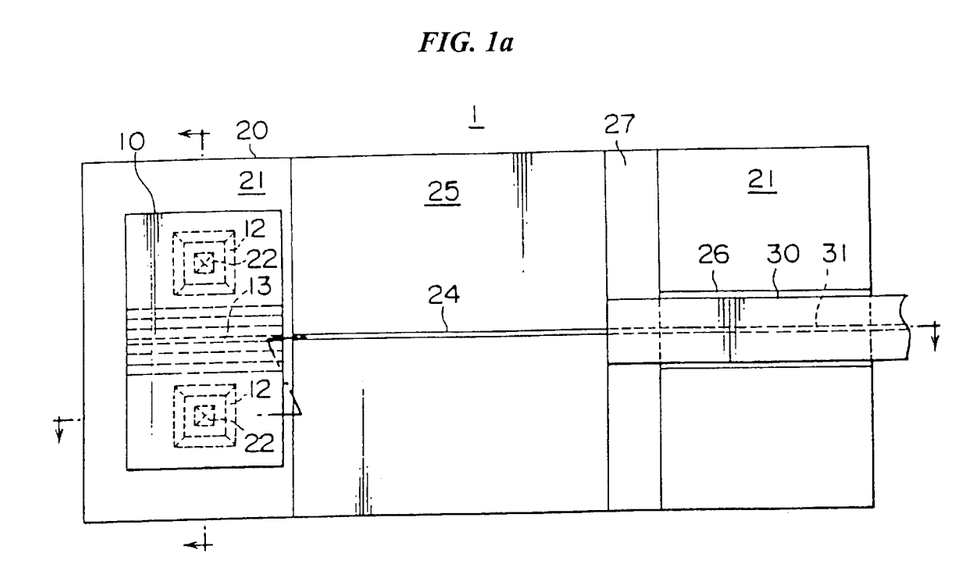
FIGS. 1a, 1b, and 1c is a structure diagram of an embodiment of an optical assembly according to the present invention.
Figure 1B:
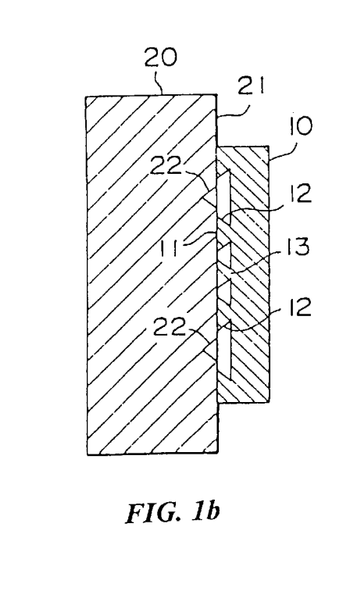
Figure 1C:
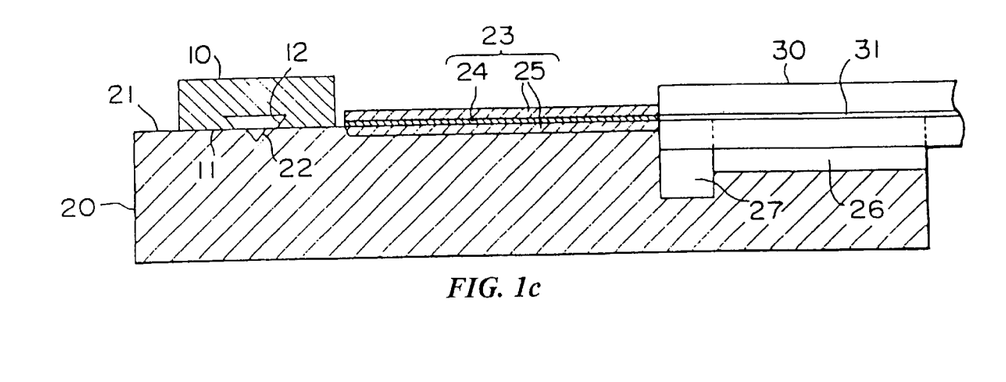

Hereafter, an embodiment of an optical assembly according to the present invention will be described by referring to drawing. FIGS. 1a, 1b, and 1c illustrate a schematic structure diagram of the optical assembly.

The optical assembly 1 includes an optical device chip 10 and a substrate 20. The substrate 20 includes an optical waveguide device 23. So as to be optically coupled to the optical waveguide device 23, the optical device chip 10 is flip-chip-bonded to a surface 21 of the substrate 20. An optical fiber 30 is disposed within a V-shaped groove 26.

The optical device chip 10 includes a semiconductor laser of reverse-mesa ridge waveguide type having a wavelength of 1.3 $\mu$m. A ridge located in the center of the chip 10 has an active area 13 in its bottom face. The ridge has an electrode on its top face. The laser beam is guided by the ridge and emitted to the optical waveguide device 23 from an end face of the chip 10. Alignment indexes 12 formed on a surface 11 of the chip 10 opposed to the substrate 20 and located on the active area side include faces sloped with respect to the surface 11.

Figure 2A:
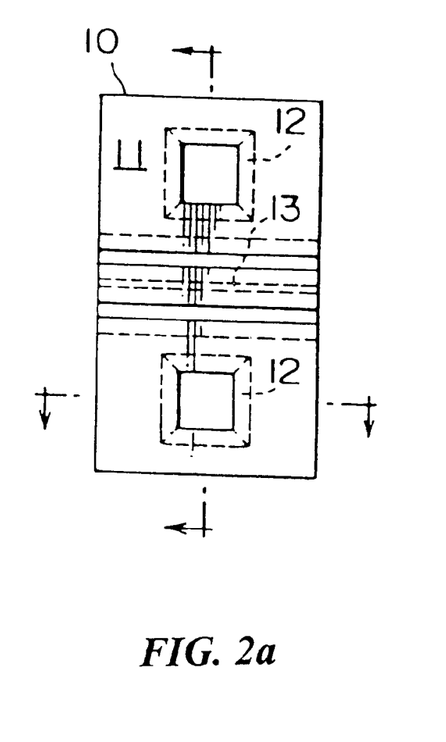
FIGS. 2a, 2b, and 2c is a structure diagram illustrating a method for forming alignment indexes of an optical device chip used in the embodiment.
Figure 2B:
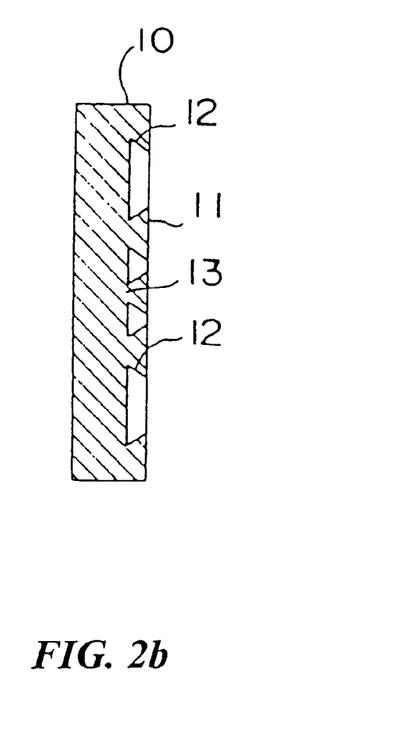
Figure 2C:
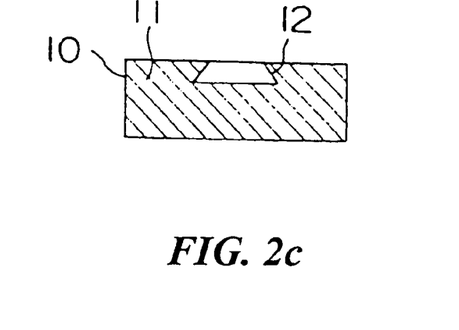

FIGS. 2a, 2b, and 2c illustrate how the alignment indexes 12 are formed. Referring to FIG. 2a, a top view of the chip 10 seen from the surface 11 is shown. In FIG. 2a, a longitudinal sectional view of the chip 10 is shown. And in FIG. 2c, a cross sectional view of the chip 10 is shown. In a ridge forming process defining the position of the active area 13, the indexes 12 are worked simultaneously with the ridge by using the same photomask and anisotropic etching. The hole forming the index 12 has an outside shape of 30 $\mu$m square, an interval of 90 $\mu$m, and a depth of 5 $\mu$m identically with the ridge. The index 12 has such a shape that a quadrangular pyramid has been cut out. The slope face of the index 12 has the same crystal plane as the side face of the ridge does. In the present embodiment, a substrate having plane orientation (100) is used as the substrate of the chip 10. Slope faces of the index 12 and the ridge have plane orientation (111). The angle formed by the surface 11 and the index 12 is approximately 55 degrees. Incident light perpendicular to the surface 11 is totally reflected by the slope face of the index 12.

Herein, bromic acid is used to perform anisotropic etching of reverse-mesa type on the chip 10 including a compound semiconductor of InP. If etching is performed by using hydrochloric acid or bromic acid with due regard to the crystal orientation, for example, a ridge or indexes of a mesa type can also be formed. Besides, in the case where the chip includes a compound semiconductor of GaAs, anisotropic etching is performed by using a solution of fluoric acid, hydrochloric acid, or the like. Depending upon the structure of the optical device chip, isotropic etching using a mixed solution of bromic acid and hydrogen peroxide or a solution of bromine and methanol may be performed or dry etching using chlorine gas or methane gas may be performed.

The substrate 20 includes a silicon crystal substrate having plane orientation (100). The substrate 20 has an optical waveguide device 23 including a silica optical waveguide and a V-shaped groove 26 including an optical fiber 30 disposed therein. The optical waveguide device 23 includes a core 24 having a cross-section of approximately 10 μm square and a cladding 25 having a thickness of approximately 20 μm. The optical waveguide 23 guides a laser beam emitted from the chip 10 and optically couples the laser beam to the optical fiber 30. Alignment indexes 22 formed on the surface 21 of the substrate 20 oppposed to the chip 10 and located on the side of waveguide 23 include faces sloped with respect to the surface 21.

Figure 3A:
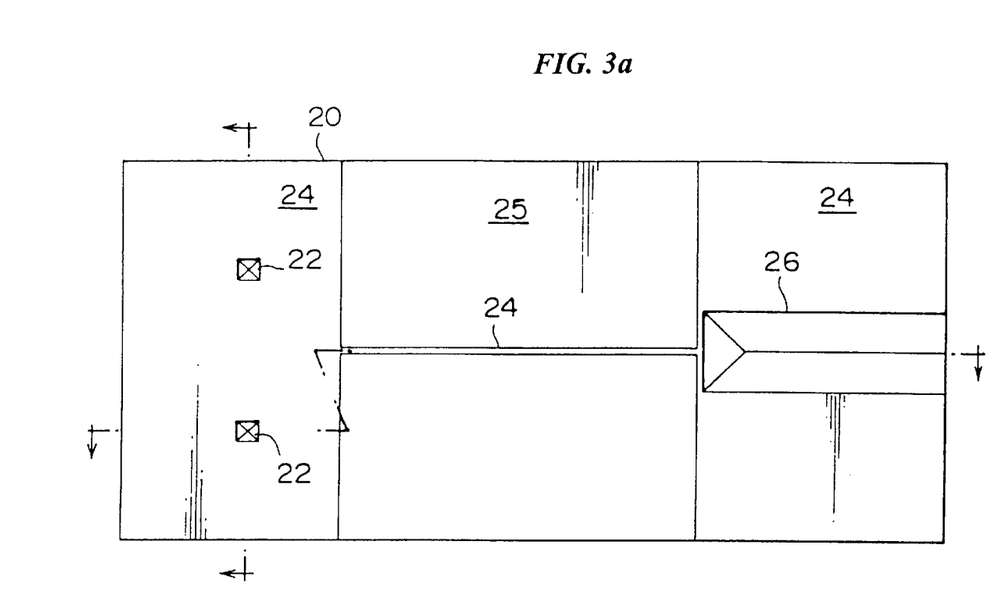
FIGS. 3a, 3b, and 3c is a structure diagram illustrating a method for forming alignment indexes of a substrate used in the embodiment.
Figure 3B:
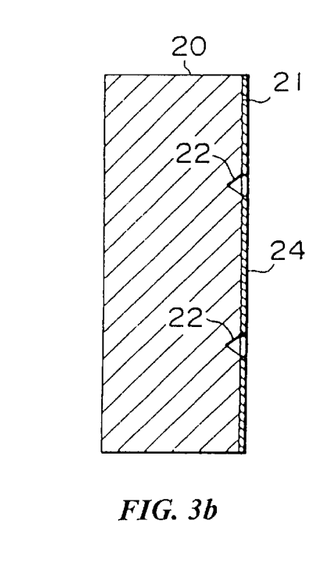
Figure 3C:
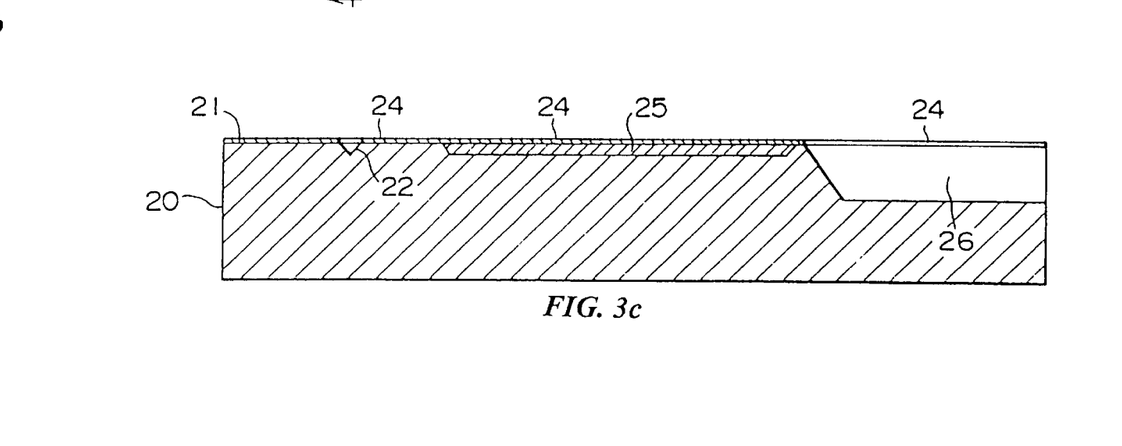

FIGS. 3a 3b and 3c are diagrams illustrating how alignment indexes 22 and the V-shaped groove 26 are formed. A top view of the substrate 20 in the midcourse of the fabrication process is shown in FIG. 3a. To the left of FIG. 3a, a longitudinal sectional view of the substrate 20 is shown in FIG. 3b. Bottom FIG. 3a, a cross sectional view of the substrate 20 is shown is FIG. 3c. In the fabrication process of the substrate 20, the cladding is first deposited in the indent of the substrate 20. Then the surface 21 functioning as the reference face is formed by polishing. Thereafter, the core material 24 is deposited on the cladding 25 and the surface 21. The core 24 is patterned by using photolithography and dry etching. At the same time, openings corresponding to the indexes 22 and the V-shaped groove 26 are patterned by using the same photomask. Anisotropic etching is performed on the substrate 20 by using the core material 24 and the cladding material 25 as etching masks. Thereby, the indexes 22 each including slope faces having the plane orientation (111) and taking the shape of a quadrangular pyramid and the V-shaped groove 26 are formed. Each of the indexes 22 is sloped at an angle of 54.7 degrees with respect to the surface 21. Incident light perpendicular to the surface 21 is totally reflected. The hole forming each of indexes 22 has an outside shape of 10 μm square and an interval of 90 μm. The V-shaped groove 26 has a width of approximately 150 μm.

As anisotropic etching solution of the silicon substrate 20, potassium hydroxide aqueous solution having a large etching rate difference between the (111) plane and another crystal plane was used. Instead of this, however, a solution of sodium hydroxide or ethylenediamine may be used. In the case where it is desired to form a circular pattern or a groove having a U-shaped section by means of isotropic etching, wet etching using a mixed solution of nitric acid and fluoric acid, for example, is performed. In some cases, dry etching using carbon fluoride gas or the like may also be performed depending upon the working shape.

In the fabrication process of the substrate 20, the above described process is conducted, and then the cladding 25 covering the core 24 is deposited and the core material 24 and the cladding material 25 of unnecessary portions around the indexes 22 and the V-shaped groove 26 are removed by etching. Electrodes are formed on the surface 21. On the portion for placing the chip 10 thereon, a thin solder film is vapor-deposited. Metallization is not performed around the indexes 22 for the purpose of alignment. The slope face located at the front end of the V-shaped groove 26 forms an obstacle when butt-coupling the core 24 of the waveguide 23 to a core 31 (having a diameter of 10 μm) of the fiber 30 (having a diameter of 125 μm). Therefore, a groove 27 having a width of approximately 100 μm and a depth of approximately 150 μm is formed by sawing or shaving. As heretofore described, the substrate 20 is completed.

Figure 4:
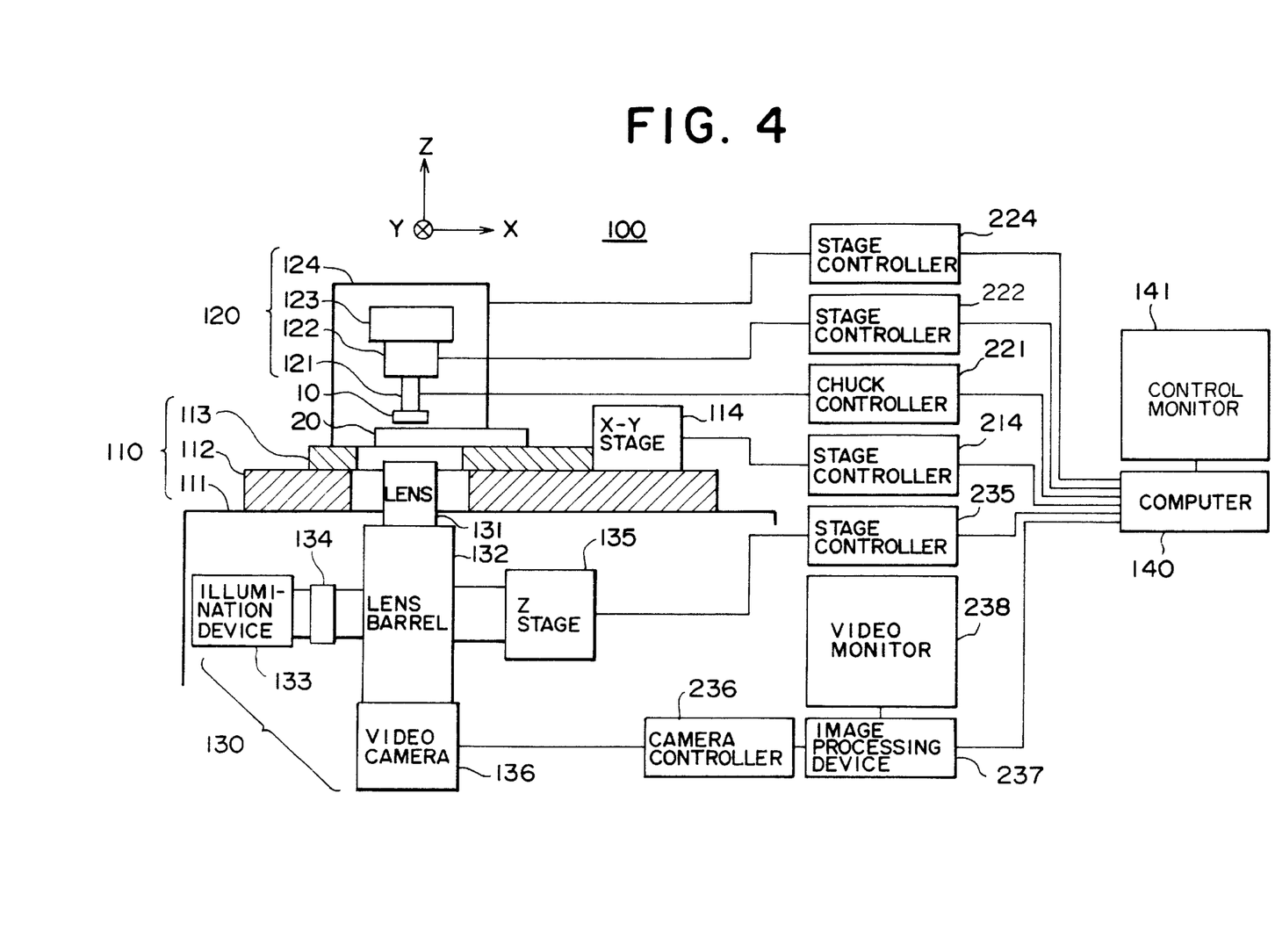
FIG. 4 is a diagram illustrating the configuration of an assembly system for performing index alignment between the optical device chip and the substrate in the embodiment.

FIG. 4 is a schematic configuration diagram of an assembly system for performing index alignment of the above described chip 10 and substrate 20. The assembly system 100 includes a base 110, a manipulator 120, a microscope 130, a device for controlling them, and a computer 140 for effecting process control.

The base 110 includes an anti-vibration table 111, a board 112, and a plate 113. To the anti-vibration table 111, the board 112 and the microscope 130 are rigidly fixed. The board 112 has an anti-vibration effect. On the board 112, the plate 113 is mounted. The plate 113 adsorbing the substrate 20 is moved in the X axis and Y axis directions by an X-Y stage 114 controlled by a stage controller 214.

The manipulator 120 includes a vacuum chuck 121, a θz stage 122, an arm 123, and an X-Y-Z stage 124. The vacuum chuck 121 for adsorbing the chip 10 is controlled by a chuck controller 221 so as to be free from the vibration of a vacuum pump. The θz stage 122 is controlled by a stage controller 222. The θz stage 122 performs rotational movement with respect to the Z axis with accuracy of 0.01° and senses the load caused when the chip 10 is mounted on the substrate 20. The chuck 121 and the stage 122 are moved in the X, Y and Z axis directions by an X-Y-Z stage 124 via an arm 123 having high rigidity. The X-Y-Z stage 124 is subjected to feedback control from a precise reference scale and stage controller 224. Positioning with accuracy as high as 0.05 μm is thus effected.

The microscope 130 is an infrared microscope for making the bottom face of the substrate 20 transmit infrared rays and observing the indexes 12 and 22. The microscope 130 includes an objective lens 131 of fifty magnifications, a lens barrel 132, an illumination device 133, and a video camera 136. The objective lens 131 has a high magnification value and a high resolution value. In due consideration of the working distance of the lens 131, opening portions are provided in the board 112 and the plate 113. The illumination device 133 performs coaxial illumination of infrared rays on the chip 10 and the substrate 20. A filter 134 sets the wavelength of the infrared ray illumination. By a Z stage 135 attached to the lens barrel 132 and a stage controller 235, auto focusing of the microscope 130 is conducted.

The video camera 136 is an infrared ray camera having a high resolution, low distortion characteristic, and low sticking. A microscope image is projected on a video monitor 238 via a camera controller 236 for adjusting the image quality and an image processing device 237. The image processing device 237 conducts measurement processing on images of the indexes 12 and 22.

In accordance with assembly process, the computer 140 controls the stage controllers 214, 222, 224 and 235, the chuck controller 221, and the image processing device 237. Control information is displayed on a control monitor 141.

Figure 5A:
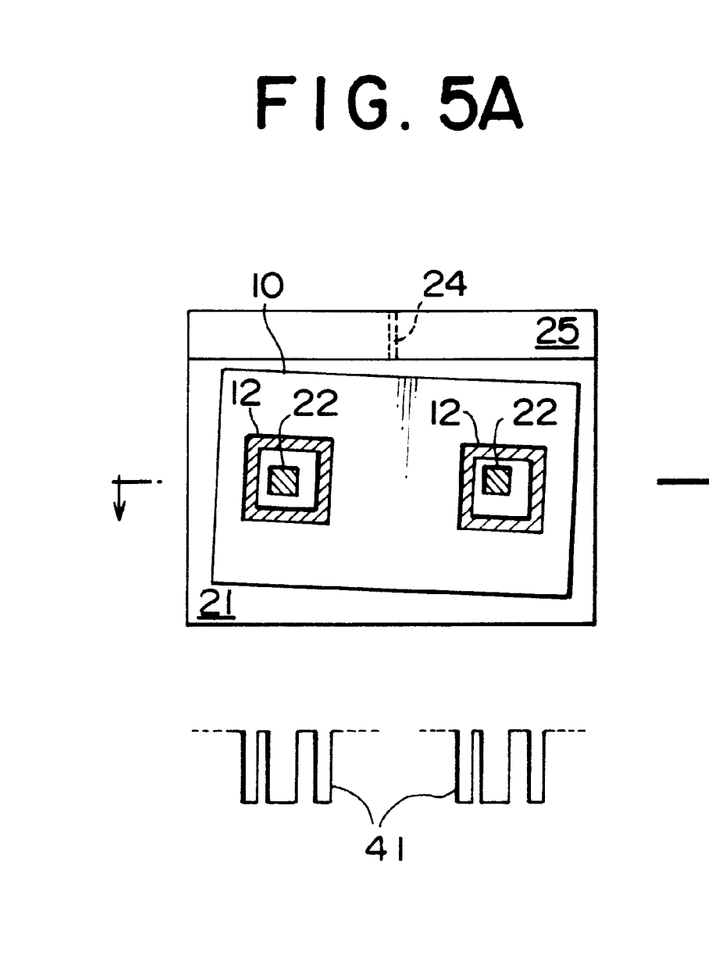
FIG. 5A is a diagram showing a monitor image of indexes before alignment in the index alignment of the embodiment.
Figure 5B:
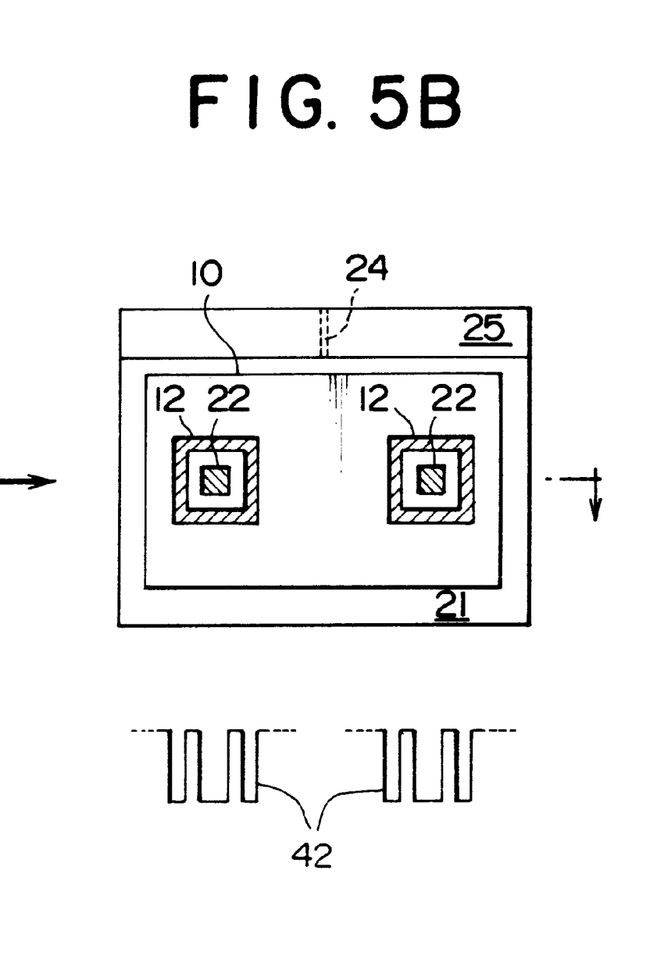
FIG. 5B is a diagram showing a monitor image of the indexes after alignment in the index alignment of the embodiment.

FIGS. 5A and 5B are diagrams illustrating a method of index alignment of the optical assembly 1 effected by the assembly system 100. FIGS. 5A and 5B show an example of a monitor image of the indexes 12 and 22. On the screen of the monitor 238, the index 12 looks like a dark square picture frame and the index 22 looks like a dark square. Because slope faces of the indexes 12 and 22 totally reflects infrared ray illumination of the microscope 130.

Before alignment (process (7) which will be described later), center coordinates of two pairs of indexes 12 and 22 do not coincide as shown in FIG. 5A. The left pair is different in the state of position deviation from the right pair. In addition to the position deviation in the X and Y axis directions, the angle around the Z axis is also deviated. As shown in the bottom of FIG. 5A, a brightness signal 41 becomes an asynchronous pattern.

The image processing device 238 takes in images of the indexes 12 and 22 and conducts image recognition and measurement processing. Specifically, the image processing device first provides the brightness signal of each pixel with a binary value, performs pattern matching of the picture frame and square, and calculates respective area centroid coordinates for two pairs of indexes 12 and 22, i.e., for a total of four patterns. Thereafter, the difference in coordinates between the index 12 and the index 22 of the first pair and the difference in coordinates between the index 12 and the index 22 of the second pair are outputted to the computer 140. In due consideration of the contrast of the indexes 12 and 22 and the performance of the detection optical system including the microscope 130 and the camera 136, the image measurement accuracy is 0.1 μm.

On the basis of the two sets of coordinate difference and a predetermined distance value between the indexes 12 (identical with the distance value between the indexes 22), the computer 140 calculates position deviation values ΔX, ΔY and Δθz of the chip 10 with respect to the substrate 20. Thereafter, the computer 140 makes the X-Y-Z stage 124 and the θz stage 122 move the chip 10 via the stage controller 222 and 224 to correct the position deviation values ΔX, ΔY and Δθz.

After alignment has been performed, the indexes 12 and 22 become concentric as shown in FIG. 5B. In other words, the centroid coordinates of the index 12 coincides with those of the index 22. As shown in the bottom of FIG. 5B, the brightness signal 42 has a symmetric pattern.

As heretofore described, index alignment of the optical assembly 1 is performed by the assembly system 100. The outline of the entire fabrication process will now be described.

(1) The substrate 20 is fed to a predetermined position of the plate 113 by a loader (not illustrated) and adsorbed.

(2) On the basis of the video signal of the camera 136, the surface 21 of the substrate 20 is brought into focus of the microscope 130 by the Z stage 135.

(3) The plate 113 is moved by the X-Y stage 114 so that the image of the index 22 may be located in a predetermined position of the screen of the monitor 238.

(4) The chip 10 is held by the chuck 121 and taken out from a tray (not illustrated).

(5) The chip 10 is moved to a predetermined position on the index 22 by the X-Y-Z stage 124.

(6) While the load applied to the chip 10 is being sensed, the chip 10 is temporarily lowered until it contacts the substrate 20 and raised by a predetermined distance.

(7) Centroid coordinates of images of two pairs of indexes 12 and indexes 22, i.e., centroid coordinates of four patterns are measured by the image processing device 237, and the coordinate difference of the first pair and the coordinate difference of the second pair are calculated by the image processing device 237.

(8) On the basis of two sets of coordinate difference and a predetermined distance between the indexes 12 (identical with the distance between the indexes 22), position deviation ΔX, ΔY and Δθz of the chip 10 are calculated.

(9) The chip 10 is moved by the X-Y-Z stage 124 and the θz stage 122 so as to correct the position deviation ΔX, ΔY and Δθz.

(10) The chip 10 is moved downward by the X-Y-Z stage 124. By applying a predetermined load to the chip 10, the chip 10 is joined temporarily with the substrate 20.

(11) The substrate 20 having the chip 10 mounted thereon is fed by a loader and taken off therefrom.

(12) The solder thin film of the substrate 20 is fused by a reflow furnace (not illustrated). The chip 10 is thus fixed to the substrate 20.

(13) The fiber 30 is stuck to the V-shaped groove 26.

By the process heretofore described, the optical assembly 1 of the present embodiment is completed.

According to the present embodiment, the indexes 12 and the indexes 22 can be formed in self alignment with the optical device chip 10 and the substrate 20 by providing indexes with slope faces. The slope faces can be easily formed by etching the holes. Furthermore, since the slope face of plane orientation (111) is formed by using the anisitropy of the crystals forming the chip 10 and the substrate 20, working controllability is high. Therefore, the indexes 12 and 22 can be advantageously formed with respect to the active area 13 of the chip 10 and the optical waveguide device 23 of the substrate 20 with high precision and with ease. Furthermore, since indexes 22 are formed simultaneously with the V-shaped groove 26, high accuracy can be obtained with respect to the optical fiber 30 as well.

Since each of the slope faces of the indexes 12 and 22 totally reflects illumination of the image detection optical system, images of high contrast are obtained. Since each of the indexes 12 and 22 takes the shape of a quadrangular pyramid, a square image facilitating image recognition is obtained. Since the image of the index 12 takes the shape of a picture frame, time required to calculate the area centroid coordinates is short. Therefore, image measurement of the indexes 12 and 22 can be advantageously performed with high precision and within a short time.

Index alignment is performed with respect to the X axis, Y axis, and θz axis. As for the Z axis, high accuracy corresponding to the ridge height is obtained because the chip 10 is subjected to flip chip bonding with the active area 13 oriented toward the substrate 20.

As heretofore described, formation and image measurement of the indexes 12 and 22 can be performed with accuracy and simply in the present embodiment. As a matter of course, therefore, alignment accuracy in index alignment is improved and the fabrication cost can be advantageously reduced.

In the present embodiment, slope faces having a constant slope angle with respect to the surface 11 of the optical device chip 10 and the surface 21 of the substrate 20 opposed to the surface 11 are used as the indexes 12 and 22. Depending upon the chip and the substrate to be used, however, even a J-shaped or Ushaped slope face having a gradually changing slope angle brings about an effect. If the index is sloped with respect to the surface of the chip or the substrate, illumination light is reflected by the slope face and the slope face is observed as a dark image. A deep-black image can be obtained by total reflection as in the present embodiment, if an index satisfying the relation $\theta \geq \theta_0 = \sin^{-1}(n_2/n_1)$ is formed where the slope angle of the index face with respect to the surface of the chip or the substrate is θ and refractive indexes of the materials or atmosphere forming the index face and its surroundings are $n_1$ and $n_2$ ($n_1 > n_2$). In the relation, $\theta_0$ is the critical angle. In the above described embodiment, the refractive index of the chip 10 including a InP semiconductor and the silicon substrate 20 each is approximately 3.4 and $\theta_0$ is 17.1 degrees. Since the slope angle of the indexes 12 and 22 is approximately 55 degrees, it satisfies the total reflection condition.

While the indexes 12 and 22 have been formed as side faces of holes, they may be combinations of grooves or moats surrounded by grooves. While each of the indexes 12 and 22 has a quadrangular pyramid generating a square image as its basic shape, a shape having a slope face such as a circular cone, a torus, a roof-like shape, or a sphere may be used in some cases. While such an index as to generate an image having closed sides has been adopted, lines or a combination thereof may be adopted depending upon the image processing method. As for the image processing method, there is a simple method such as the edge coordinate extraction calculation besides the centroid calculation as in the above described embodiment. With due regard to the detection accuracy and the processing time, an image processing method is selected. While the indexes 12 and 22 have been worked by using anisotropic etching, working means such as isotropic etching, deposition, or joining may be used. While in the present embodiment the indexes 12 and 22 having slope faces have been formed in both the chip 10 and the substrate 20, the effects of the present invention are obtained even if the slope index is effected in only one of the chip 10 and the substrate 20 and indexes of the conventional technique are adopted in the other of them.

Figure 6A:
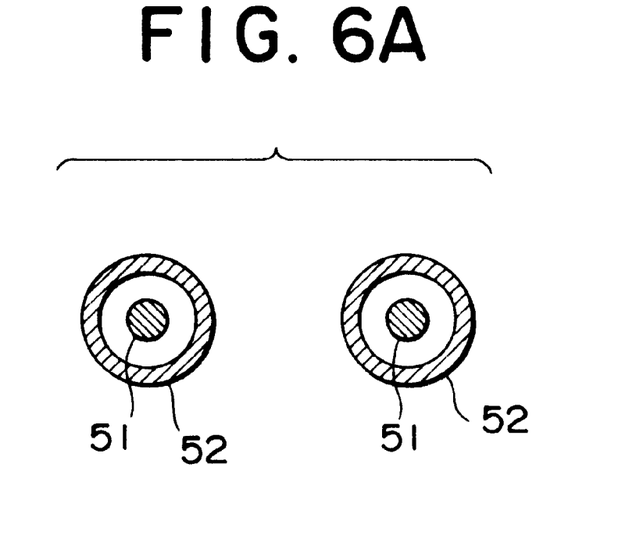
FIG. 6A is a diagram showing an example of index shapes in index alignment of another embodiment.

FIGS. 6A and 6B show examples of indexes having shapes different from those of the above described embodiment. FIG. 6A shows circular indexes 51 and ring-shaped indexes 52. These can be formed by isotropic wet etching or dry etching. When conducting image processing, the image detection accuracy in the case of the circular pattern does not depend upon the angle between the scanning line of the image and the side of the index unlike the square index of the above described embodiment. Therefore, the circular pattern is suitable for the case where the dispersion of the slope of indexes is comparatively large.

Figure 6B:
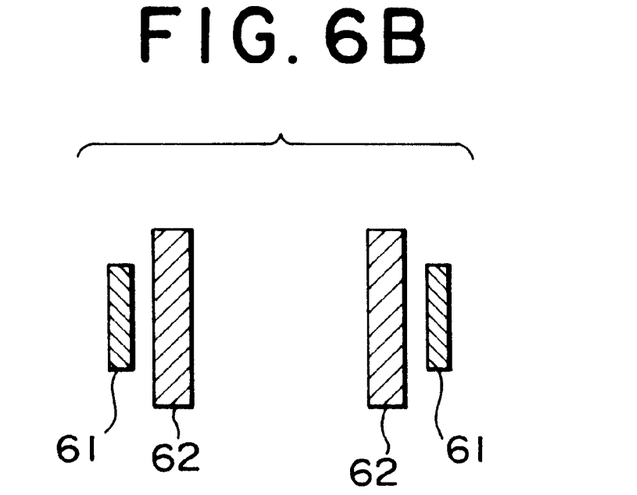
FIG. 6B is a diagram showing another example of index shapes in index alignment of still another embodiment.

FIG. 6B shows combinations of rectangular indexes 61 and 62. These include V-shaped grooves or U-shaped grooves and can be worked by using a method similar to that of square indexes of the above described embodiment. In the image processing, the detection accuracy in the direction parallel to shorter sides of the rectangles 61 and 62 becomes higher than that in the direction parallel to longer sides thereof. Therefore, the present method is suitable for the case where higher accuracy is needed in the shorter-side direction, such as the case where there is the optical axis in the longer-side direction.

While in the present embodiment a reversemesa ridge waveguide type semiconductor laser is used as the optical device chip, the present invention may be applied to a index waveguide type laser such as a mesa ridge waveguide type laser or a buried structure type laser, a gain waveguide type laser, or a surface emission laser. Furthermore, the optical device chip is not limited to active optical devices such as a laser, a light emission diode, or a waveguide/surface detection type photodiode, and it may be passive optical devices such as an optical waveguide device including a semiconductor, a dielectric, or an organic material, for example, or a micro-optic device.

While as an example of the substrate a silicon crystal substrate having a rectilinear silica waveguide 23 formed thereon has been used, the material of the substrate may be changed depending upon the function required of the optical waveguide or the substrate. It is a matter of course that the function of branch, wavelength division/mixture, or the like may be incorporated in the waveguide. In some cases, there are no waveguides. As for the materials of the substrate and the waveguide, a dielectric such as glass, an organic material or ceramics, or a compound semiconductor is used besides silicon or silica. On the semiconductor substrate, active optical devices and integrated circuit devices may be provided. Furthermore, while the optical fiber 30 has been mounted on the substrate 20, a connector receptacle of the optical fiber may be disposed on the substrate.

As for the alignment system, indexes formed on the optical device chip and the substrate are observed by using coaxial illumination in the present embodiment. According to this illumination method, the microscope system 132 and the illumination system 133 can be installed collectively on one side of the base 110 as shown in FIG. 4. On the other side of the base 110, therefore, a space for the chuck 121 and the stage 124 can be sufficiently secured. This results in an advantage that the chip 10 and the substrate 20 can be handled easily.

Figure 7:
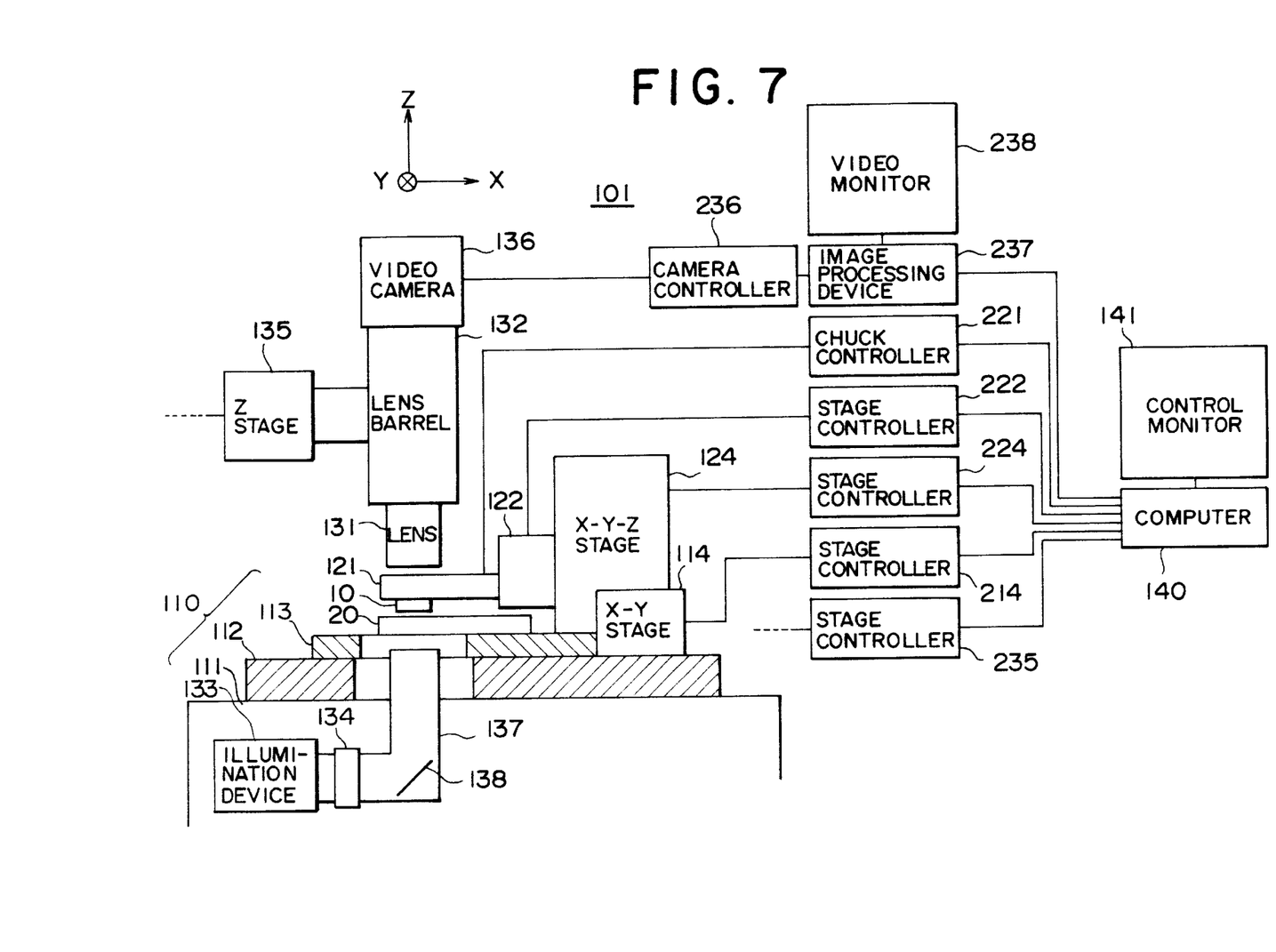
FIG. 7 is a diagram illustrating an example of another configuration of the assembly system for performing index alignment between an optical device chip and a substrate.

As another illumination method, there is transmission illumination as shown in FIG. 7. In an assembly system 101 shown in FIG. 7, components having the same functions as those of FIG. 4 are denoted by like numerals. The system 101 differs from the system of FIG. 4 in that an illumination system 133 is disposed on the opposite side of the base 110 from the microscope system 132, illumination is performed from the rear side of the substrate 20 by a mirror 138 and a housing 137, and indexes 11 and 12 are observed by using transmitted light. This transmission illumination method brings about an effect that a clear image with a higher contrast than that of the vertical illumination as shown in FIG. 4 can be captured, although it can be generally said. However, the optical characteristic of the transmission material used for the chuck 121 and the ridigity of the transmission material and the stage 124 must be taken into consideration.

As heretofore described, the present invention can be widely applied to optical assemblies including optical device chips and substrates and brings about a great effect.

What is claimed is:

1. An optical assembly comprising:
    an optical device chip having a first surface;
    a substrate having a second surface for mounting said first surface of said chip closely thereon;
    first alignment index formed within said first surface;
    second alignment index formed within a region of said second surface opposed directly to said first surface;
    at least one set of said first and second alignment indexes comprising a face sloped with respect to the surface;
    a first image of said first alignment index and a second image of said second alignment index projected onto an imaginary plane parallel to said first and second surfaces, wherein said first surface and said second surface are separated from each other.

2. The optical assembly according to claim 1, wherein said alignment indexes comprises holes or moats.

3. The optical assembly according to claim 1, wherein each of said alignment indexes comprises a quadrangular pyramid as its basic shape.

4. The optical assembly according to claim 1, wherein a projection image of said slope face onto said surface takes the shape of a picture frame.

5. The optical assembly according to claim 1, wherein said chip or said substrate comprises a crystal, and said slope face comprises a crystal plane.

6. The optical assembly according to claim 5, wherein said slope face comprises a crystal plane having surface orientation.

7. The optical assembly according to claim 1,
    wherein a slope angle $\theta \geq \sin^{-1}(n2/n1)$ where $\theta$ is an angle of said slope face for said first surface or said second surface, n1 and n2 are refractive indexes of a material forming said chip or said substrate at said slope face and material surrounding over said slope face, said refractive indexes are defined for an illumination light transmittable by at least one of said chip or said substrate, and wherein n1>n2.

8. The optical assembly according to claim 1, wherein said alignment indexes are formed by etching simultaneously with the device portion formed on said chip or said substrate, comprises said slope face parallel to the face determining said device portion, or said alignment indexes, formed by etching using, as a mark, a material identical to at least a part of said device portion including said slope face adjacent and close to said material.

9. The optical assembly according to claim 8, wherein said chip or said substrate comprises an optical waveguide device, and wherein said alignment indexes are formed by etching simultaneously with etching for determining a core of said optical waveguide device, or by etching using, as a mask, a core material of said optical waveguide device.

10. The optical assembly according to claim 8, wherein said chip or said substrate comprises and optical semiconductor device, and wherein said alignment indexes are formed by etching simultaneously with etching for determining an active area or a waveguide area of said optical semiconductor device.

11. The optical assembly according to claim 1, wherein said chip comprises and active area or a waveguide area nearby said first surface, said first alignment index is formed around said active area or said waveguide area, and said chip is subjected to flip chip bonding to said substrate.

12. The optical assembly according to claim 1, wherein said chip or said substrate comprises a silicon crystal having plane orientation, said slope face comprises a crystal plane having plane orientation, and wherein said optical assembly comprises a V-shaped groove for disposing an optical fiber therein, and said V-shaped groove includes a crystal plane of plane orientation parallel to said slope face.

13. An optical assembly comprising:

an optical device chip including a light emission portion or light receiving portion, said optical device chip having a first alignment index formed within said optical device chip, said first alignment index including a slope face portion formed simultaneously with said light emission portion or light receiving portion;

an optical substrate, said optical substrate having an optical waveguide portion or a groove portion for positioning an optical waveguide device, said optical substrate also having a second alignment index formed within said optical substrate, said second alignment index including a slope face portion formed simultaneously with said optical waveguide portion or said groove portion; and said optical device chip and said optical substrate being positioned by passive alignment using image measurement for said first alignment index and said second alignment index, wherein a projected image of said first alignment index and a projected image of said second alignment index are separated from each other, thereby said optical device chip being fixed to said optical substrate.

* * * * *